Figure 3:
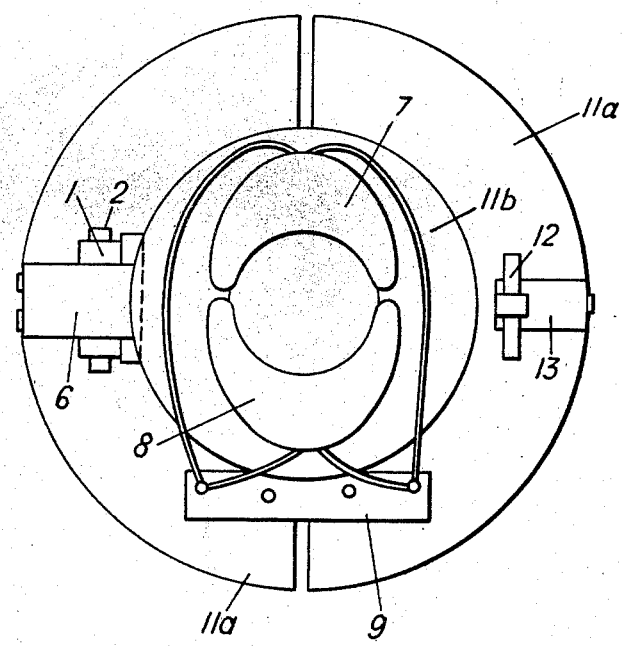

June 22, 1965 R. G. R. ROBINSON 3,191,105
SCANNING COIL ASSEMBLIES
Filed March 6, 1962 2 Sheets-Sheet 1
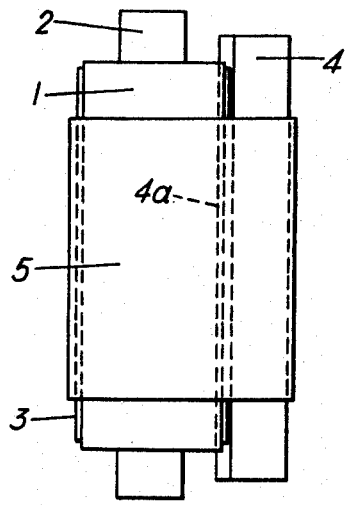
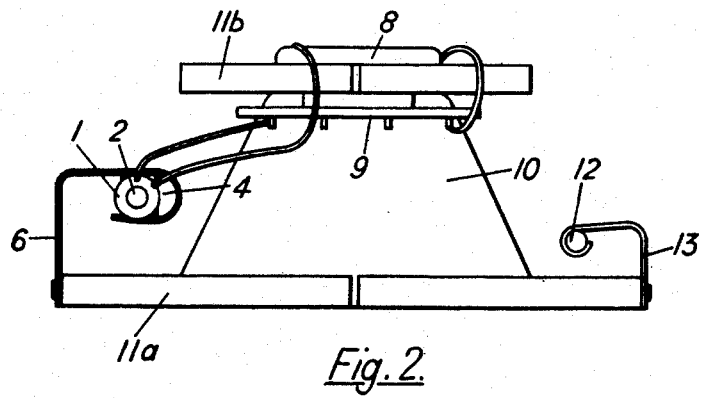
Inventor
RAYMOND G. R. ROBINSON

United States Patent Office 3,191,105
Patented June 22, 1965

3,191,105
SCANNING COIL ASSEMBLIES
Raymond G. R. Robinson, Cambridge, England, assignor to Pye Limited, Cambridge, England
Filed Mar. 6, 1962, Ser. No. 177,791
Claims priority, application Great Britain, Mar. 7, 1961, 8,268/61
8 Claims. (Cl. 317—200)

The present invention relates to scanning coil assemblies such as are used in television receivers and other apparatus for applying scanning waveforms to a cathode ray tube beam to produce a raster.

To correct for distortion in the raster it is common practice to provide small premanent magnets in the field of the coils and either to pre-set these into a suitable position or more usually to fix the magnets to supports of thin metal, e.g., aluminum so that the position of the magnets to give optimum results could be achieved by contorting the supports. It is also common practice to provide a small inductance coil, called a linearity coil, connected in series with the line scan coils to correct for any non-linearity of the line scan deflection on the cathode ray tube screen, such linearity coil usually having means to adjust its inductance to the requisite value for the particular application. The adjusting means was often a small permanent magnet.

According to the present invention a scanning coil assembly for a cathode ray tube comprises a linearity coil with a ferro-magnetic core and a bias permanent magnet which is adapted for use also for correcting raster distortion.

More specifically the invention uses a linearity coil having a ferro-magnetic core as well as a magnet or magnets for producing a bias magnetizing force, said linearity coil, core and biasing magnet or magnets being arranged together adjacent the scanning coils in such a manner that their position can be adjusted with respect to the scanning coils so that the biasing magnet or magnets may serve also to correct for the distortion of the raster.

The above and other features of invention will be more readily understood by a perusal of the following description having reference to the accompanying drawings in which FIG. 1 is a plan of a linearity coil and magnet assembly which may be used in carrying out the invention; FIG. 2 and FIG. 3 are side elevation and plan respectively of a scanning coil assembly according to the invention. In FIGS. 2 and 3 the frame scan coils, being of conventional form, are omitted for the sake of clarity.

Referring to FIG. 1, a linearity coil 1 is layer-wound upon a ferrite core 2 and bonded in known manner. The coil is covered by a protective layer of cloth tape 3 and is strapped to the bias magnet 4 by means of an adhesive tape 5. The bias magnet may be shaped at 4a to conform to the shape of the coil, for example by having one concave or partially concave surface. Where the bias magnet is formed by casting, as is often the case, it is readily possible to shape the other surfaces of this magnet to fit the support employed for mounting the magnet and linearity coil on the scanning coil assembly.

The biasing magnet is manufactured in the de-magnetized form and is magnetized to the desired degree at a convenient stage during manufacture of the scanning coil assembly. Thus the biasing magnetizing force applied to the linearity coil can be adjusted to the desired value by magnetizing the bias magnet to saturation and then demagnetizing it in steps while checking the linearity coil until the required characteristic is achieved.

As shown in FIGS. 2 and 3, the linearity coil and biasing magnet are mounted upon the scanning coil assembly by means of a flexible support 6 of non-magnetic metal. The coil 2 is connected in series with the line scanning coils 7 and 8 by leads to a tag panel 9 to which the circuit connections are made in known manner. The magnetic yoke of the scanning coil assembly is indicated at 10 and is assembled about a plastics molding of which a lower flange 11a and upper flange 11b are to be seen in FIGS. 2 and 3. The frame coils (not shown) are supported on the outside of the yoke in known manner. The assembly also comprises a small permanent magnet 12 clamped in a flexible non-magnetic metal bracket 13. When the scanning circuits have been set up, any distortion in the raster can be reduced by adjusting the position of the magnet 4 and the magnet 12 by contorting their flexible supports until the distortion is reduced to a satisfactory amount. This movement of the magnet 4 does not disturb its physical relationship with the linearity coil. Thus the arrangement according to the present invention effects a saving in components since the bias magnet also serves as a component for correcting for raster distortion, and therefore at least one of the normally provided raster distortion correction magnets need no longer be provided. Moreover the necessity for a mechanical sub-assembly allowing for adjustment between the bias magnet and the linearity coil may also be avoided.

The linearity coil unit comprising the coil, core and biasing magnet may be in a form other than that shown and the bias magnet may be in more than one part of which one only need be adjustable. For example one part of the magnet may be located in a pocket specially provided in the flange 11a, the linearity coil being positionally adjustable with respect to the magnet. Also in some cases the linearity coil unit may be assembled in a fixed relation to the scan coils where the degree of tolerence permitted does not require the adjustment above described.

I claim:

1. In a scanning coil assembly for a cathode ray tube, line scan coils for electromagnetically deflecting an electron beam in said tube; a magnetic yoke on said tube in the magnetic fields of said coils; and a linearity correction sub-assembly mounted for adjustable positioning in relation to said yoke, said sub-assembly comprising a coil wound on a magnetic core and electrically connected to said line scan coils, a permanent magnet, and means for maintaining said coil and said magnet in a preset positional relationship relative to each other.

2. A scanning coil assembly according to claim 1 in which said sub-assembly is adjusted in relation to said yoke to correct for raster distortion.

3. A scanning coil assembly according to claim 1 in which said coil and said magnet are bound together and preadjusted to correct for non-linearity in said line scan coils.

4. A scanning coil assembly according to claim 1 in which said coil and said magnet are bound together and the magnetizing force of said magnet is adjusted after said subassembly has been assembled.

5. A scanning coil assembly for a cathode ray tube comprising an upper and a lower flange of insulating material; a yoke of magneitc material between said flanges; line scan coils extending between said flanges; and a linearity correction sub-assembly mounted for adjustable positioning in relation to said yoke, said sub-assembly comprising a coil formed on a magnetic core and electrically connected to said line scan coils, and a permanent magnet mounted in a preset positional relationship relative to said coil.

6. A scanning coil assembly according to claim 5 in which said sub-assembly is adjustable to correct for raster distortion.

7. A scanning coil assembly for a cathode ray tube comprising a magnetic yoke, line scan coils about said yoke; a linearity correction coil electrically connected to said line scan coils, said correction coil being formed on a magnetic core; a biasing magnet; means for binding together said linearity coil and said biasing magnet into a sub-assembly; and means supporting said sub-assembly for adjustable positioning in relation to said yoke.

8. A scanning coil assembly according to claim 7 wherein said last name means are of thin non-magnetic soft metal.

References Cited by the Examiner

UNITED STATES PATENTS

| | | | |
|---|---|---|---|
| 2,717,323 | 9/55 | Clay | 317—200 |
| 2,852,712 | 9/58 | Fabel | 317—200 |
| 2,963,609 | 12/60 | Fisher et al. | 317—200 |

LARAMIE E. ASKIN, *Primary Examiner.*

E. JAMES SAX, JOHN F. BURNS, *Examiners.*